United States Patent
Tornatore et al.

[19]

[11] Patent Number: 5,988,009
[45] Date of Patent: Nov. 23, 1999

[54] CONTROL DEVICE FOR A GEARBOX OF A VEHICLE WITH ACTUATOR AND CAM ACTIVATED SELECTION OF GEARS

[75] Inventors: Giovanni Tornatore, S. Benigno Canavese; Gianluigi Lenzi, Bologna, both of Italy

[73] Assignee: Magneti Marelli S.p.A., Milan, Italy

[21] Appl. No.: 08/990,967

[22] Filed: Dec. 15, 1997

[30] Foreign Application Priority Data

Dec. 17, 1996 [IT] Italy ................................ T096A1035

[51] Int. Cl.⁶ ................................................ B60K 20/00
[52] U.S. Cl. ........................................ 74/473.27; 74/337.5
[58] Field of Search ........................... 74/473.27, 473.11, 74/337.5

[56] References Cited

U.S. PATENT DOCUMENTS

| | | | |
|---|---|---|---|
| 4,891,999 | 1/1990 | Scott | 74/337.5 |
| 5,094,121 | 3/1992 | Von Kaler | 74/473.27 |
| 5,150,629 | 9/1992 | Morris et al. | 74/337.5 |
| 5,251,503 | 10/1993 | Morris et al. | 74/337.5 |
| 5,590,563 | 1/1997 | Kuwahata et al. | 74/337.5 |
| 5,740,695 | 4/1998 | Janson | 74/337.5 |
| 5,809,836 | 9/1998 | Patzold et al. | 74/337.5 |

FOREIGN PATENT DOCUMENTS

| | | |
|---|---|---|
| 0 038 787 A2 | 10/1981 | European Pat. Off. . |
| 795701 | 9/1997 | European Pat. Off. . |
| 7-91537 | 4/1995 | Japan . |

*Primary Examiner*—Tamara L. Graysay
*Assistant Examiner*—David Fenstermacher
*Attorney, Agent, or Firm*—Oliff & Berridge, PLC

[57] ABSTRACT

A control device for a gearbox of a vehicle is provided with fixed support. A control element carried by the fixed support is able to move along a first axis to carry out a gear rank selection operation and also able to rotate about the first axis to carry out a gear engagement/disengagement operation. An actuator having an output element movable along a second axis is orthogonal to the first axis and cooperating with the control element to rotate it about the first axis. An engagement element carried in an integral manner by the control element is also provided. A cam which can be activated selectively and is suitable for cooperating in a sliding manner with the engagement element to displace the control element axially by a predetermined quantity during the rotation of the control element about the first axis is included. Selective activation of the cam during the gear selection operation is possible.

10 Claims, 3 Drawing Sheets

5,988,009

CONTROL DEVICE FOR A GEARBOX OF A VEHICLE WITH ACTUATOR AND CAM ACTIVATED SELECTION OF GEARS

BACKGROUND OF THE INVENTION

The invention relates to a control device for a gearbox of a vehicle, particularly for a gearbox of the automatic type. Devices of the above-mentioned type are known, and substantially comprise a control element suitable for adopting four different positions along a first axis of its own, the selection of a gear corresponding to each of these positions, and for adopting three different angular positions contained in planes orthogonal to the above-mentioned first axis, the engagement of a gear or the neutral position corresponding to each of these positions. This control element is brought into the above-mentioned positions by the action of suitable actuators: normally, a first multi-position actuator is used to control the movements along the first axis whilst a second actuator, also a multi-position one, and movable along a second axis orthogonal to the first axis, is used to control the angular movements about the said first axis.

The above-mentioned actuators are normally operated pneumatically, hydraulically or electrically and are controlled by associated activation means; in particular, in the case of hydraulic operation, each actuator is controlled by a plurality of solenoid valves suitably combined together.

To operate it, the above-mentioned control element therefore requires the use of various relatively complex fluidic components, such as multi-position actuators, valves, travel regulation elements, position transducers, for example, which require accurate mechanical machining work and give rise to structural devices of high cost.

SUMMARY OF THE INVENTION

The object of the invention is to provide a control device for a gearbox of a vehicle which does not have the disadvantages connected with the control devices of known type and specified above.

This object is achieved by the present invention in that it relates to a control device for a gearbox of a vehicle comprising:

fixed support means;

a control element carried by the said fixed support means so as to be able to move along a first axis to carry out a gear rank selection operation, and to be able to rotate about the said first axis to carry out a gear engagement/disengagement operation, the said control element being further suitable for adopting, about the said first axis and for each rank of the gears, an angular neutral position and two angular positions of engagement of respective gears; and actuator means having an output element movable with respect to the said fixed support means and cooperating with the said control element to rotate it about the said first axis and dispose it in the said neutral and engagement positions;

characterized in that it comprises an engagement element carried in an integral manner by the said control element, cam means which can be activated selectively and are suitable for cooperating in a sliding manner with the said engagement element to displace the said control element axially by a pre-determined quantity during the rotation of the said control element about the said first axis, and means of selective activation of the said cam means during the said gear selection operation.

BRIEF DESCRIPTION OF THE DRAWINGS

For a greater understanding of the invention, a preferred embodiment will be described below, purely by way of non-exhaustive example and with reference to the accompanying drawings in which.

DETAILED DESCRIPTION OF THE INVENTION

Figure 1:
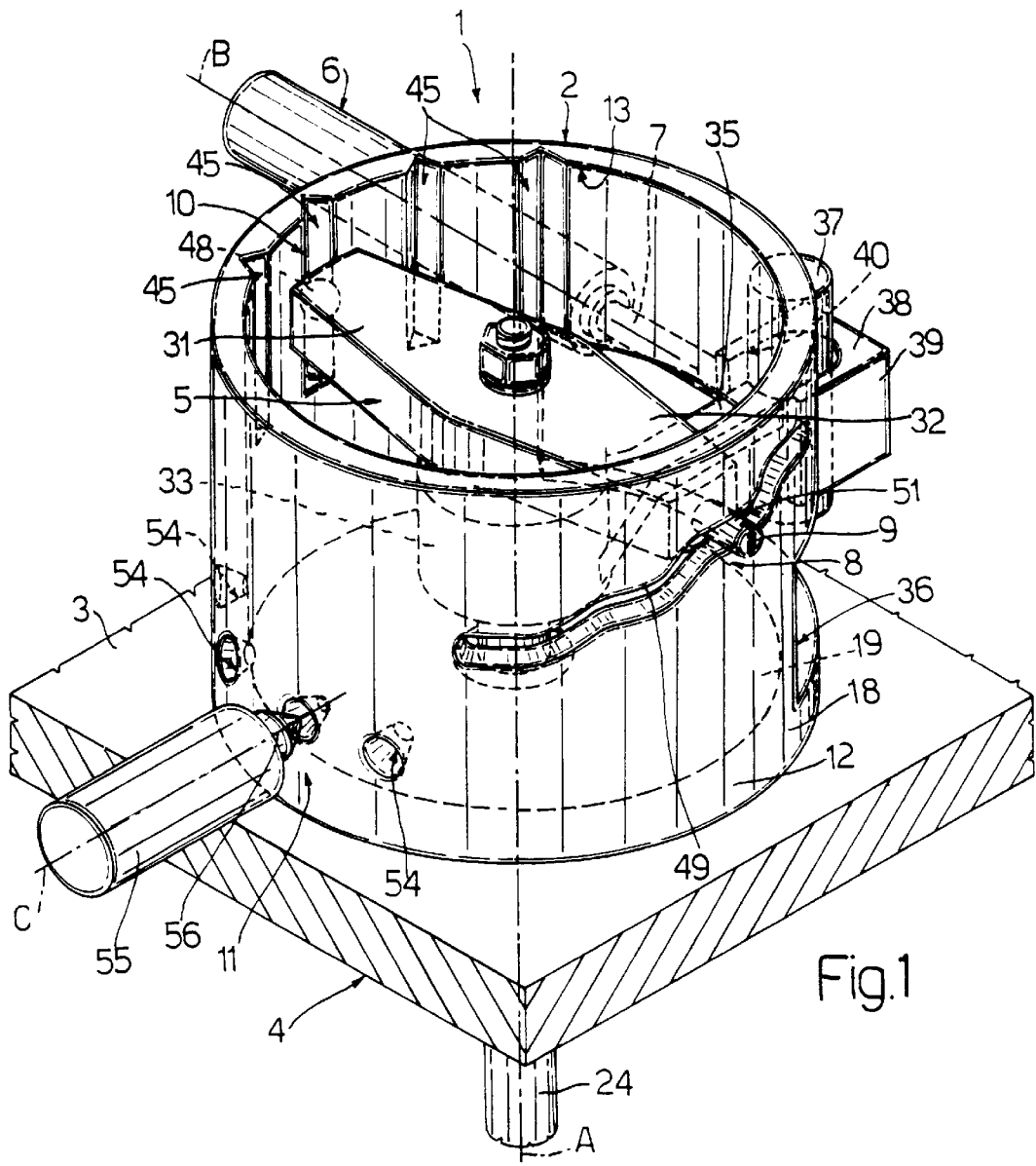
FIG. 1 is a perspective view of a control device for a gearbox of a vehicle, produced according to the invention.

With reference to FIGS. 1 to 5, in its entirety 1 denotes a control device for an automatic gearbox (not shown) of a vehicle (also not shown).

The device 1 comprises an internally hollow drum 2 mounted in rotating manner about a first longitudinal axis A of its own, on a fixed support element 3, in this case a wall of a box 4 (only partially shown) housing the gearbox, and a control element 5 of axis A which is movable with respect to the element 3 and housed inside the drum 2 in a manner that is axially sliding and angularly rotating about the said axis A.

In particular, the control element 5 is movable along the axis A to carry out a gear rank selection operation, and rotates about the said axis A to carry out an engagement/disengagement operation of the gear selected. More precisely, for each rank of the gears, the control element 5 is suitable for adopting an angular intermediate neutral position and two angular opposed lateral positions of engagement of respective gears. These lateral positions are angularly spaced between each other and with respect to the axis A by an angle $\beta$; in the case shown, the engagement positions are angularly equi-spaced from the neutral position and define relative angles $\alpha$ (FIG. 4) equal to half the angle $\beta$ with the said neutral position and with respect to the axis A.

Figure 3:
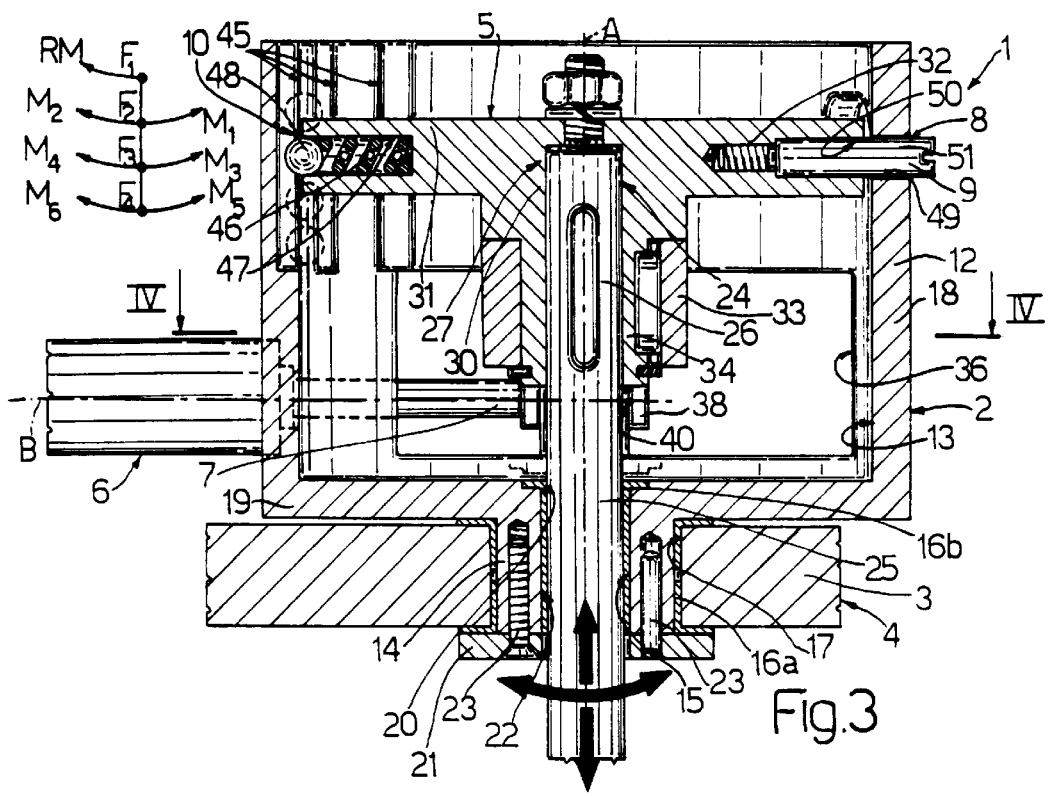
FIG. 3 is a section through III-III of FIG. 2.

As an example by way of clarification, FIG. 3 shows a simplified diagram of the engagement and selection positions adopted by the control element 5; in this diagram, the letters $F_1$, $F_2$, $F_3$, $F_4$ denote the central neutral positions of the ranks that can be selected by means of the movement of translation of the control element 5, and $M_1$, $M_2$, $M_3$, $M_4$, $M_5$, $M_6$, RM denote the lateral engagement positions obtained by means of the angular rotation movement of the control element 5 about the axis A.

The device 1 further comprises a hydraulic actuator 6, of known type and only partially shown in FIGS. 1 to 5, having an output element 7 movable along an axis B orthogonal to the axis A and cooperating with the control element 5 to rotate it about the said axis A and dispose it, within each rank, in the said neutral and engagement positions; cam means 8 carried by the drum 2 and suitable for cooperating in a sliding manner with an engagement element 9 carried in an integral manner by the control element 5 to displace the said control element 5 axially by a pre-determined quantity during the rotation of the latter about the axis A with respect to the drum 2; releasable snap-restraining means 10 disposed on a side diametrically opposite the cam means 8 with respect to the axis A, angularly connecting the control element 5 to the drum 2 and suitable for transmitting torques of an intensity lower than a pre-determined limit value M; and stop means 11 suitable for fixing the drum 2 with respect to the box 4 during the selection operation and for generating, during the rotation of the control element 5, a restraining reaction on the restraining means 10 having an intensity such as to exceed the limit value M of the torque which can be transmitted by the said restraining means 10 and to permit the release thereof and the sliding of the element 9 with respect to the cam means 8.

In particular, the drum 2 comprises a main tubular cylindrical portion 12 of axis A defining internally a cavity 13 and a secondary portion 14, also tubular cylindrical, of axis A extending axially in a projecting manner from the portion 12, having a central through-hole 15 of axis A communicating with the cavity 13, having an external diameter smaller than the diameter of the portion 12 and engaged in rotating manner, by means of the interposition of a bushing 16a, in a through-hole 17 produced in the element 3. The portion 12 is open in correspondence with an axial end of its own opposite the portion 14 and comprises a cylindrical lateral wall 18 and a wall 19 of circular base, from which the portion 14 extends and which has a circular through-opening 20 of communication between the cavity 13 and the hole 15. A disc 21 of axis A, having an external diameter greater than the hole 17 of the element 3 and having in its turn a central hole 22 of axis A with the same diameter as the hole 15, is integrally connected by means of a plurality of screws 23 to the portion 14 of the drum 2 on the side opposite the portion 12 so as axially to secure the drum 2 to the element 3.

The control element S comprises a shaft 24 of axis A having a first portion 25 engaged in axially sliding and angularly rotating manner in the holes 15 and 22 by means of the interposition of a bushing 16b, and projecting inside the box 4 to control in known manner associated internal components (not shown) of the gearbox, and a second portion 26 housed in the cavity 13 and supported axially by the lateral wall 18 of the drum 2, in the manner described below.

The control element 5 further comprises an annular flange 27 of axis A mounted on the portion 26 of the shaft 24, integrally connected in known manner to the said portion 26 and having an upper portion 30 provided integrally with a pair of radial arms 31, 32 extending in a projecting manner from diametrically opposite sides of the said portion 30 substantially along a same diametral axis with respect to the drum 2. One (31) of the arms 31, 32 is secured to the lateral wall 18 of the drum 2 by means of the restraining means 10 whereas the other arm 32 is provided with the element 9 which is coupled with the cam means 8.

The control element 5 further comprises a sleeve 33 of axis A keyed on a lower portion 34 of the flange 27 and integrally provided with a radial arm 35 which extends substantially in orthogonal direction to the arms 31, 32, engages with clearance a through-opening 36 produced in the lateral wall 18 of the drum 2 and has a free cylindrical end portion 37 having an axis parallel to the axis A, projecting externally from the drum 2 and cooperating with the element 7 of the actuator 6.

Figure 4:
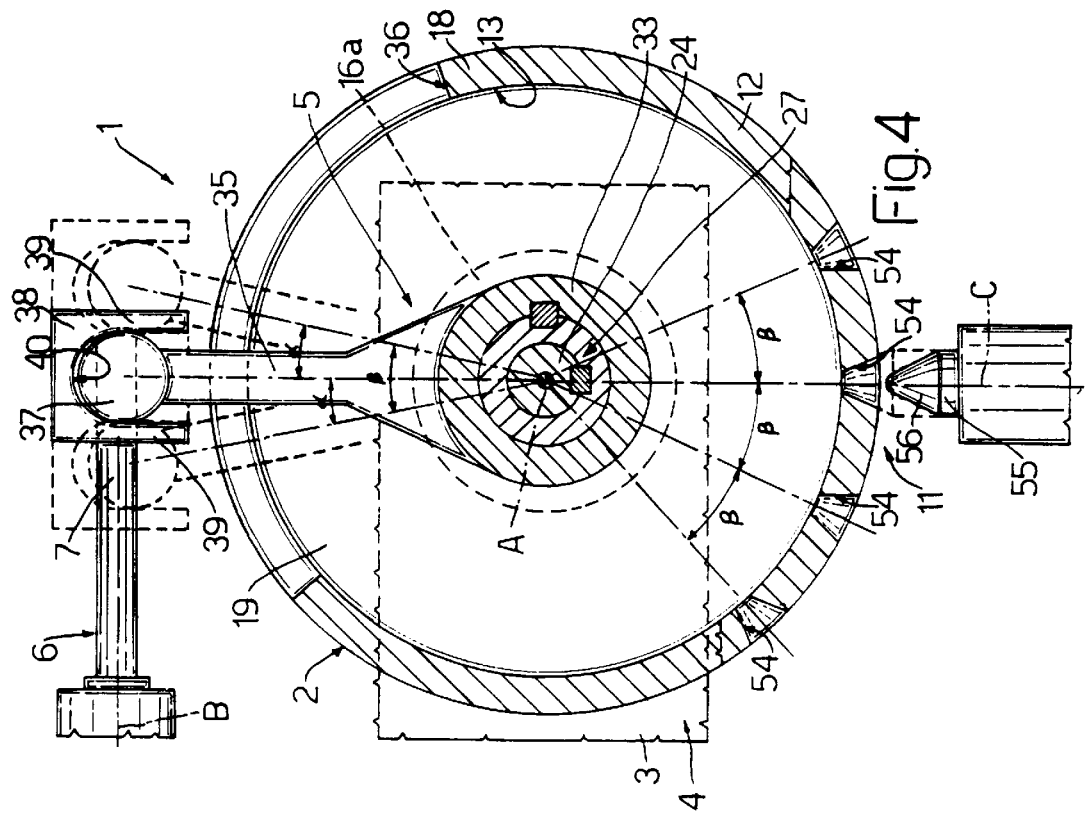
FIG. 4 is a section through IV-IV of FIG. 3.

More specifically, the element 7 has a substantially fork-shaped end portion 38, which comprises a pair of walls 39 facing each other, orthogonal to the axis B and defining a substantially U-shaped through-notch 40 engaged by the portion 37 of the arm 35. The element 7 is suitable for adopting two axial end-of-travel positions, corresponding to the engagement positions of the control element 5, and a median axial position corresponding to the neutral position of the said control element 5 (FIG. 4).

Figure 2:
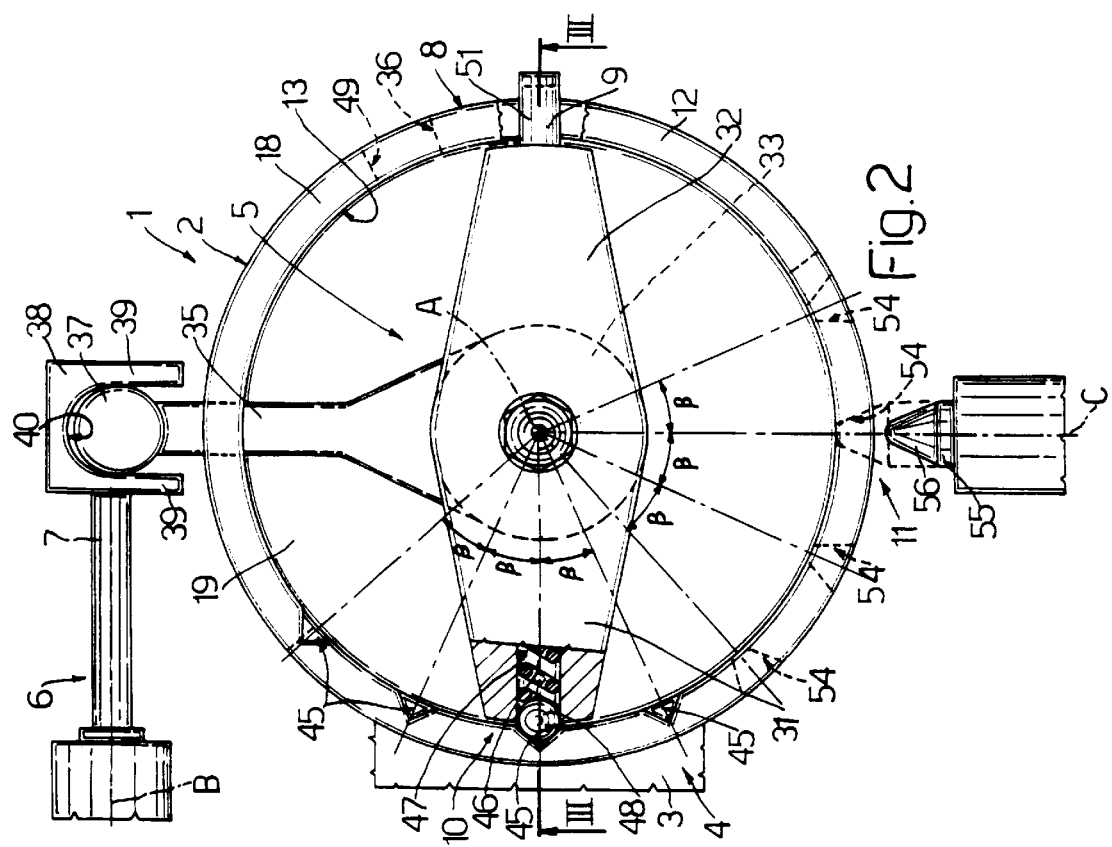
FIG. 2 is a top view of the device of FIG. 1.

With reference to FIGS. 1 to 3, the restraining means 10 comprise a plurality of longitudinal V-shaped grooves 45 which are equal between each other and produced in the lateral wall 18 of the drum 2, a cylindrical helical spring 46 housed in a radial blind hole 47 produced in a free end portion of the arm 31, and a ball element 48 housed in correspondence with an end of the hole 47, loaded by the spring 46 and maintained by the said spring in engagement with one of the grooves 45. In particular, the grooves 45 are equal in number to the number of ranks of the gears,t four in this case, and are disposed each angularly equi-spaced from the adjacent grooves 45; more precisely, in a similar manner to the above relating to the angular distance between the engagement positions of the control element 5, each groove 45 is angularly spaced from the adjacent groove 45 by an angle β with respect to the axis A.

It is also evident that the limit value M of the torque which can be transmitted by the restraining means 10 depends on the flexible stiffness of the spring 46 and on the geometry of the grooves 45 and of the element 48.

Figure 6:
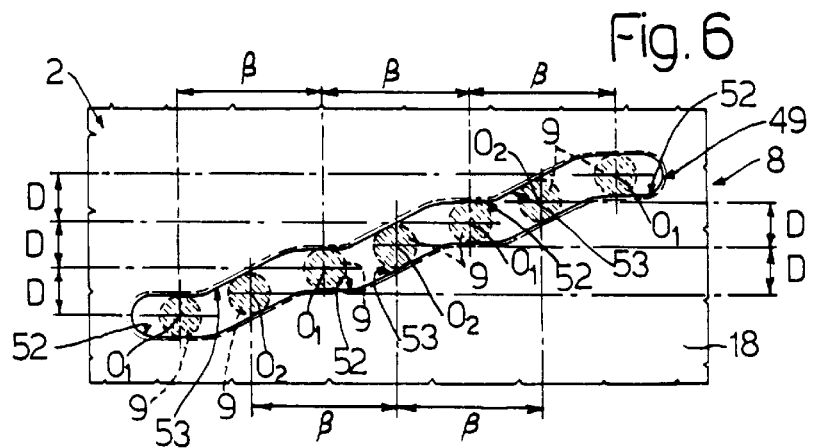
FIG. 6 is a development on plan of a detail of the device of FIG. 1.
Figure 5:
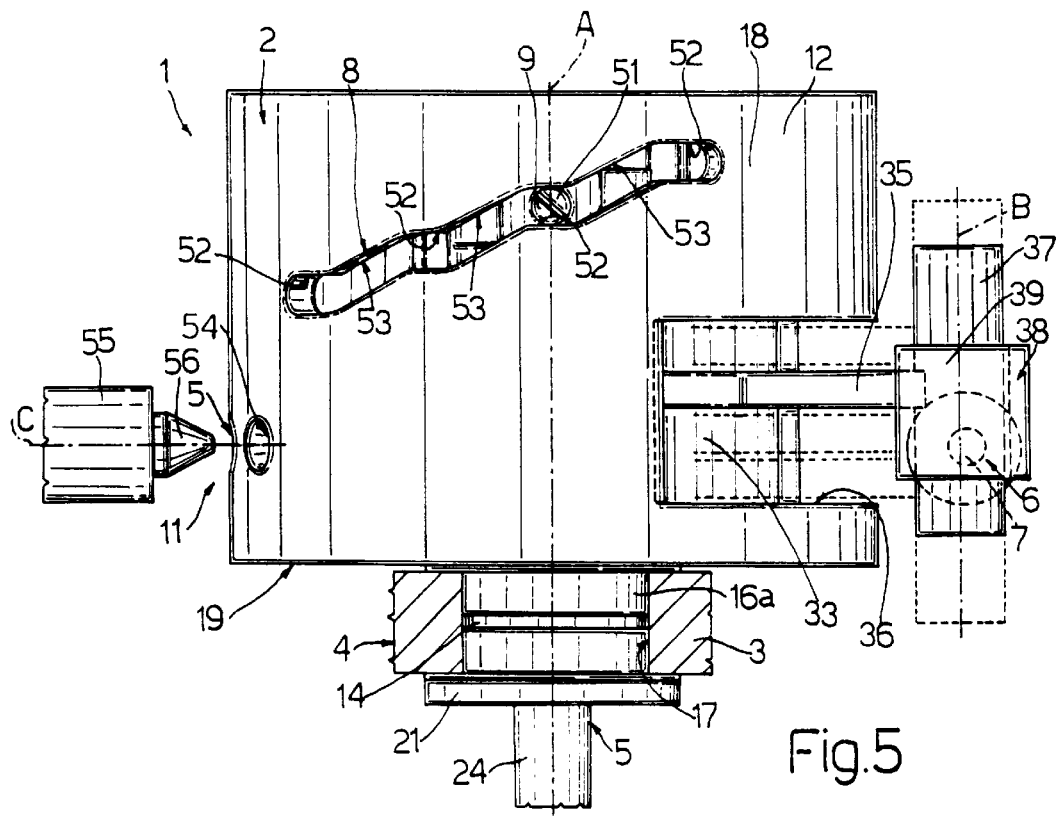
FIG. 5 is a side view of the device of FIG. 1.

With particular reference to FIGS. 1, 5 and 6, the cam means 8 are constituted by a shaped slit 49 produced in the lateral wall 18 of the drum 2 on the side diametrically opposite the grooves 45 and engaged by the element 9.

In particular, the element 9 is constituted by a peg which is screwed into a radial blind hole 50 produced in the arm 32 and has an end portion 51 radially projecting from the said arm 32 and coupled with the slit 49.

The slit 49 substantially has the shape of a broken line and comprises a plurality of angular sections 52 which act as axial stops of the control element 5, which are equal between each other and equal in number to the number of ranks of the gears, in this case four; the sections 52 extend on respective planes orthogonal to the axis A and are each spaced from the adjacent planes by a pre-determined quantity D depending on the distance between ranks of the adjacent gears, and are disposed each angularly spaced from the adjacent sections 52 by an angle β with respect to the axis A, in a similar manner to the grooves 45. The slit 49 further comprises a plurality of oblique angular sections 53, in this case three, connecting between them the adjacent sections 52 and formed so as to guide the element 9 along a path defined by the composition of an angular displacement of the angle β about the axis A and of a linear displacement of the quantity D along the said axis A.

The sections 52 define respective selection positions adopted by the control element along the axis A and corresponding to the relative ranks of the gears.

Therefore, the form of the slit 49 is such that homologous points $O_1$ of adjacent sections 52, or homologous points $O_2$ of adjacent sections 53, are angularly spaced between each other with respect to the axis A by the angle β and are axially spaced between each other by the quantity D (FIG. 6).

With reference to FIGS. 1 to 5, the stop means 11 comprise a plurality of radial truncated cone-shaped through-holes 54, tapered towards the axis A, of a number equal to the number of ranks of the gears, in this case four, produced in the lateral wall 18 of the drum 2 and disposed each angularly equi-spaced from the adjacent holes 54; the stop means further comprise a locking element 55, with an axis C which is radial with respect to the axis A, disposed externally with respect to the drum 2 on the side diametrically opposite the element 7 and movable axially with respect to the box between a rest position, in which it has a truncated cone-shaped end head of its own 56 spaced from the lateral wall 18 of the drum 2, and an activation position, in which its own head 56 is engaged in one of the holes 54 and thus prevents the rotation of the drum 2 about the axis A with respect to the box 4.

In particular, the element 55 is operated in electromagnetic manner and is moved into the activation position during the gear rank selection operation.

Finally, each hole 54 is also angularly spaced from the adjacent hole 54 by an angle β with respect to the axis A.

In use, to shift from one gear to the next within the same rank—to shift from gear M1 to gear M2, foi example—it is necessary to dispose the element 55 into the rest position and axially move the element 7 of the actuator 6 from the end-of-travel position corresponding to the gear currently engaged, in the specific case M1, towards the opposite end-of-travel position corresponding to the gear to be engaged, in this specific case M2.

The movement of the element 7 produces a rotation of the control element 5 about the axis A by the angle β in the anti-clockwise direction in FIG. 4.

Because the element 55 is in the rest position, and does not therefore generate any restraining reaction on the restraining means 10, the drum 2 rotates integrally with the control element 5; the holes 54 are positioned along the lateral wall 18 of the drum 2 in such a way that, with every rotation of the said drum 2 about the axis A by the angle β, one of them is disposed face to face with the element 55.

To return to the preceding gear, it is sufficient to move the element 7 axially in the opposite direction.

To shift from a gear of a particular rank, such as gear M2, to a successive gear of an adjacent rank, such as M3, it is necessary to displace the element 55 into the activation position in which it engages the hole 54 facing it, and, then, to move the element 7 axially from the end-of-travel position corresponding to the gear currently engaged, in the specific case M2, towards the opposite end-of-travel position corresponding to the gear to be engaged, in this specific case M3.

During the consequent rotation of the control element 5 about the axis A the element 55 generates on the restraining means 10 a restraining reaction greater than the limit value M of the torque which these means may transmit and it therefore causes the release of the element 48 from the relative groove 45. Therefore, the control element 5 rotates about the axis A with respect to the drum 2 and is guided in this rotation by the profile of the slit 49. In particular, the displacement of the element 7 produces a displacement of the element 9 from one of the sections 52 of the slit 49 to the successive section 52, passing through the relative section 53 interposed between them and, consequently, it brings about the axial movement of the control element 5 by the quantity D and the rotation of the control element 5 about the axis A by the angle β.

When the element 7 reaches the end of its travel, the element 48 is disposed in engagement in the groove 45 immediately following the initial one.

To return to the preceding gear, in the case in question to shift from gear M3 to gear M2, it is sufficient to move the element 7 axially in the opposite direction, maintaining the element 55 in the activation position.

The operations described are managed automatically by an electronic gearbox control unit (known and not shown) fitted to the vehicle.

From an examination of the characteristics of the device 1 produced according to the invention, the advantages which can be achieved will be evident.

In particular, the device described is simple and economical to produce in that it enables both the selection of the ranks of gears and the engagement/disengagement of the said gears to be controlled by means of a single multi-position actuator of conventional type, such as the actuator 6. With respect to the known devices, this saves at least one multi-position actuator, reduces the number of valves essential to the operation of the device 1, which are reduced solely to the valves required to control the actuator 6, and consequently simplifies the hydraulic actuation circuit. Furthermore, the device 1 is extremely compact and of reduced size.

Finally, it will be clear that modifications and variants which do not depart from the protective scope defined by the claims can be introduced to the device 1.

In particular, the engagement positions of the control element 5 could be angularly spaced from the neutral position of the said control element 5 by respective angles $\alpha_1$, $\alpha_2$ which are different from each other, although their sum should in any event be equal to the angle β.

Furthermore, the angles β and the distances D relating to each rank of gears could adopt different values from the values adopted by the angles β and the distances D in adjacent ranks.

Finally, the stop means 11 could be produced in a different way from those described above, for example they could be constituted by a friction braking device selectively cooperating with the drum 2.

We claim:

1. A control device for a gearbox of a vehicle, comprising:
 a fixed support;
 a control element carried by the fixed support adapted to move along a first axis to carry out a gear rank selection operation and adapted to rotate about the first axis to carry out a gear engagement/disengagement operation, the control element being further suitable for adopting, about the first axis and for each rank of the gears, an angular neutral position and two angular positions of engagement of respective gears, the control element comprising an engagement element integral with the control element;
 an actuator having an output element movable with respect to the fixed support and cooperating with the control element to rotate the control element about the first axis and dispose the control element in the neutral and engagement positions;
 a support element mounted on the fixed support in a rotating manner about the first axis, the support element having a tubular body coaxial to the first axis which internally houses the control element;
 a cam, having a shaped through-slit in a lateral wall of the support element, that cooperates in a sliding manner with the engagement element to displace the control element axially by a pre-determined quantity during the rotation of the control element about the first axis, the through-slit has the form of an irregular line and comprises a plurality of angular stop sections of the control element, extending on respective planes orthogonal to the first axis and each disposed angularly offset from adjacent stop sections, the through-slit including a plurality of angular oblique sections disposed between and connecting adjacent stop sections formed to constrain the engagement element along a path defined by the combination of a pre-determined angular displacement about the first axis and of a pre-determined linear displacement along the first axis, the stop sections defining respective selection positions of the control element along the first axis and corresponding to relative ranks of the gears;

a releasable restrainer angularly connecting the control element to the support element and suitable for transmitting loads of intensity lower than a pre-determined limit value; and a stop device that locks the support element with respect to the fixed support during the selection operation, and during the rotation of the control element, generating a restraining reaction on the restrainer which exceeds the limit value of the load transmitted by the restrainer and permitting the release of the restrainer and the sliding of the engagement element with respect to the cam.

2. The device according to claim 1, wherein:

the stop sections are separated equally with respect to each other and the oblique sections are also separated equally with respect to each other;

the through-slit being formed such that homologous points ($O_1$) of adjacent stop sections are angularly spaced with respect to each other and with respect to the first axis by an angle ($\beta$) and homologous points ($O_2$) of adjacent obliques sections are angularly spaced with respect to each other and with respect to the first axis also by an angle ($\beta$);

the angle ($\beta$) being equal to an angle defined with respect to the first axis between the angular engagement positions of the control element.

3. The device according to claim 1, wherein the retrainer further comprises:

a plurality of longitudinal V-shaped grooves, equal in number to the number of ranks of gears, produced in the lateral wall of the support element and each angularly spaced from the adjacent grooves;

flexible means carried by the control element; and a ball element biased by the flexible means and maintained thereby in engagement with one of the grooves.

4. The device according to claim 3, wherein each of the grooves defines with an adjacent groove and with respect to the first axis an angle ($\beta$) equal to an angle defined with respect to the first axis between the angular engagement positions of the control element.

5. The device according to claim 1, wherein the stop device comprises a plurality of radial through-holes of a number equal to the number of ranks of gears and produced in the lateral wall of the support element, and a locking element, with an axis which is radial with respect to the first axis, disposed externally with respect to the support element and movable axially with respect to the fixed support between a rest position, in which the locking element has an end head spaced from the lateral wall of the support element, and an activation position, in which the end head is engaged in one of the holes and prevents the rotation of the support element about the first axis with respect to the fixed support.

6. The device according to claim 5, wherein each hole defines with the adjacent hole and with respect to the first axis an angle ($\beta$) equal to an angle defined with respect to the first axis between the angular engagement positions of the control element.

7. The device according to claim 5, wherein the holes substantially have a shape of a truncated cone which is tapered towards the first axis and the end head of the locking element has a form complementary to the holes.

8. The device according to claim 1, wherein the output element of the actuator is movable along a second axis (B) orthogonal to the firs axis.

9. The device according to claim 8, wherein the output element of the actuator is disposed externally with respect to the support element and has an end portion which is substantially fork-shaped and defining a U-shaped notch, and the control element comprises an arm extending radially with respect to the first axis, engaged within a clearance of an opening produced in the lateral wall of the support element and having a cylindrical end portion engaging the notch of the output element.

10. A control device for a gearbox, comprising:

a fixed support;

a control element, carried by the fixed support, movable along a first axis to carry out a gear rank selection operation, and adapted to rotate about the first axis to carry out a gear engagement/disengagement operation, the control element suitable for adopting, about the first axis and for each rank of the gears, an angular neutral position and two angular positions of engagement of respective gears, the control element further comprising:

an engagement element integral with the control element; and an arm extending radially with respect to the first axis;

an actuator having an output element movable with respect to the fixed support and cooperating with the control element to rotate the control element about the first axis and dispose the control element in the neutral and engagement positions, wherein the output element of the actuator is movable along a second axis (B) orthogonal to the first axis and is disposed externally with respect to a support element and has an end portion which is fork-shaped and defining a U-shaped notch, the arm of the control element engaged within a clearance of an opening produced in the lateral wall of the support element and having a cylindrical end portion engaging the notch of the output element; and a cam that can be activated selectively and cooperates in a sliding manner with the engagement element to displace the control element axially by a pre-determined quantity during rotation of the control element about the first axis.

* * * * *